United States Patent [19]

DeRees

[11] 4,034,509
[45] July 12, 1977

[54] WINDOW REGULATOR

[75] Inventor: Delbert Duane DeRees, Utica, Mich.

[73] Assignee: American Motors Corporation, Detroit, Mich.

[21] Appl. No.: 679,537

[22] Filed: Apr. 23, 1976

[51] Int. Cl.² ........................................ E05F 11/44
[52] U.S. Cl. .................................... 49/353; 49/374
[58] Field of Search ............ 49/348, 349, 350, 351, 49/353, 169–171, 374

[56] References Cited

U.S. PATENT DOCUMENTS

| 1,405,510 | 2/1922 | Gates | 49/351 |
| 1,408,879 | 3/1922 | Gates | 49/351 |
| 1,772,659 | 8/1930 | Borgeson | 49/351 |
| 2,026,719 | 1/1936 | Westrope | 49/351 X |
| 2,646,276 | 7/1953 | Fezzey | 49/353 X |

FOREIGN PATENT DOCUMENTS

| 453,923 | 9/1936 | United Kingdom | 49/353 |

Primary Examiner—Kenneth Downey
Attorney, Agent, or Firm—Reising, Ethington, Barnard, Perry and Brooks

[57] ABSTRACT

A vehicle body window regulator of the disclosure incorporates a toggle linkage that is selectively moved between extended and overlapping positions to maintain a window in open or closed positions. The toggle linkage includes a pair of links that are pivotally connected to each other about a first axis, with one of the links pivoted about a second axis to a control member connected to the window, and with the other link selectively driven on a frame of the regulator about a third axis for movement that positions the linkage in either its extended or overlapping position. The first axis moves across a line between the second and third axes as the linkage is moved to either the overlapping or extended position, and the linkage then engages a frame stop to cause a locking action that prevents window movement due to forces applied directly to the window. A one-way clutch preferably drives the linkage and positions the window in partially open positions. This clutch also aids the locking action of the linkage in preventing window movement from its open or closed positions. A door which incorporates the window regulator has a fixed upper window and a movable lower window. The regulator frame is mounted below a downwardly and forwardly projecting portion of the fixed upper window and the control member includes a long leg that extends rearwardly for connection to the lower window as well as a short leg that is connected to the toggle linkage about the second axis. The control member is pivotally supported on the frame by a pivotal counterbalance at the juncture of its long and short legs and is pivoted by the linkage to move the lower window vertically.

9 Claims, 4 Drawing Figures

WINDOW REGULATOR

BACKGROUND OF THE INVENTION

1. Field of the Invention

The present invention relates to a vehicle body window regulator incorporating a toggle linkage for positioning a movable window in both open and closed positions, and also relates to a vehicle door that incorporates the window regulator.

2. Description of the Prior Art

Conventional vehicle body window regulators incorporate sector gears that are driven by either manually rotatable or power-driven pinion gears to raise and lower associated windows. Window regulators of this type are shown by U.S. Pat. Nos. 2,850,333; 2,852,249; and 2,934,785. Such window regulators have also incorporated one-way clutches to prevent reverse driving of the regulator, see for example U.S. Pat. No. 3,110,380. Another type of vehicle window regulator incorporates a lead screw actuation for moving an associated window between open and closed positions as is shown by U.S. Pat. No. 2,974,539.

Vehicle body window regulators have also included manually actuated pivotal handles that move associated windows between open and closed positions. Examples of this type of window regulator are shown by U.S. Pat. Nos. 2,996,296; 3,389,500; and 3,438,150. Instead of having a handle that is rotated a number of times to raise and lower an associated window, this type of window regulator has a handle that is pivotally moved less than 360° to raise and lower its associated window.

Additionally, it is also known to have a vehicle window in which a latch mechanism extends directly between the window and an adjacent window frame to position the window in either an open or closed position by movement of the latch mechanism, see U.S. Pat. No. 3,236,555.

SUMMARY OF THE INVENTION

The present invention relates to an improved vehicle body window regulator incorporating a toggle linkage for moving an associated window between open and closed positions. The linkage incorporates a pair of links pivotally connected to each other about a first axis. A control member pivotally mounted on a frame of the regulator is pivotally connected to one of the links about a second axis. A pivotal actuator selectively drives the other link on the frame for movement about a third axis so as to move the linkage between overlapping and extended positions and to thereby move a window connected to the control member vertically between open and closed positions. The first linkage axis moves across a line between the second and third axes upon linkage movement to either the overlapping or extended position. The linkage is engaged with the frame in both the overlapping and extended positions to prevent window movement from either the open or closed position by forces applied directly to the window.

In the preferred embodiment disclosed, a one-way clutch is incorporated into the window regulator to cooperate with the linkage in preventing the reverse driving by forces applied directly to the window. This clutch comprises the pivotal actuator that moves the linkage and has an output shaft that is connected to the link pivoted on the frame about the third axis. The frame preferably has a plate-like structure with the toggle linkage mounted on one of its sides and the clutch mounted on its other side and having the clutch output shaft projecting through the frame. An input shaft of the clutch projects away from the plate to provide attachment of a manually pivoted handle. The toggle link supported by the clutch output shaft is preferably shorter than the toggle link connected to the control member. The control member includes a short arm which is connected to the longer toggle link and a long arm that is connected to the window. A pivotal counterbalance pivotally supports the control member on the frame at a juncture between its long and short arms.

A vehicle body door disclosed in the preferred embodiment incorporates the window regulator and has a fixed upper window and a movable lower window located below the upper window. The regulator is selectively actuated to move the lower window vertically between open and closed positions. The upper window of the door has a portion that projects downwardly and forwardly in front of the lower window and the window regulator frame is mounted on the door below this downwardly and forwardly projecting upper window portion. The longer arm of the window regulator control member projects rearwardly from the frame for connection to the movable lower window and enables the regulator to raise and lower this window upon manually actuated movement of its toggle linkage.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
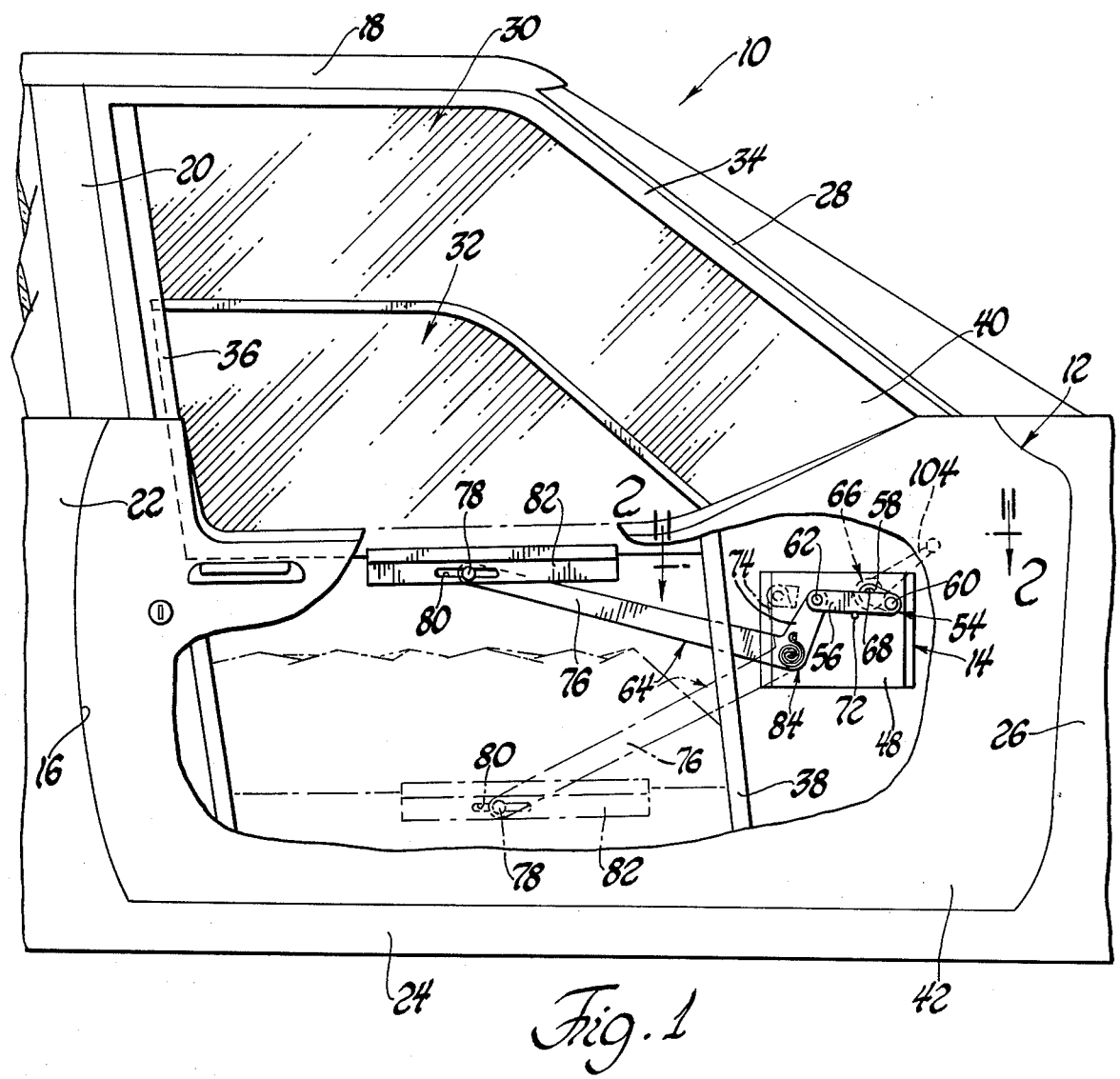
FIG. 1 is a partially broken-away side elevation view of a vehicle body door and window regulator that embody the present invention.

Referring to FIG. 1 of the drawings, a vehicle body generally indicated by 10 incorporates a door 12 and a door window regulator 14 that embody the present invention. The door 12 is movable from an open position to a closed position within a door opening 16 that is cooperatively defined by the vehicle roof 18, a door pillar 20, a rear quarter panel 22, a rocker panel 24, a front fender 26, and a windshield pillar 28.

Figure 2:
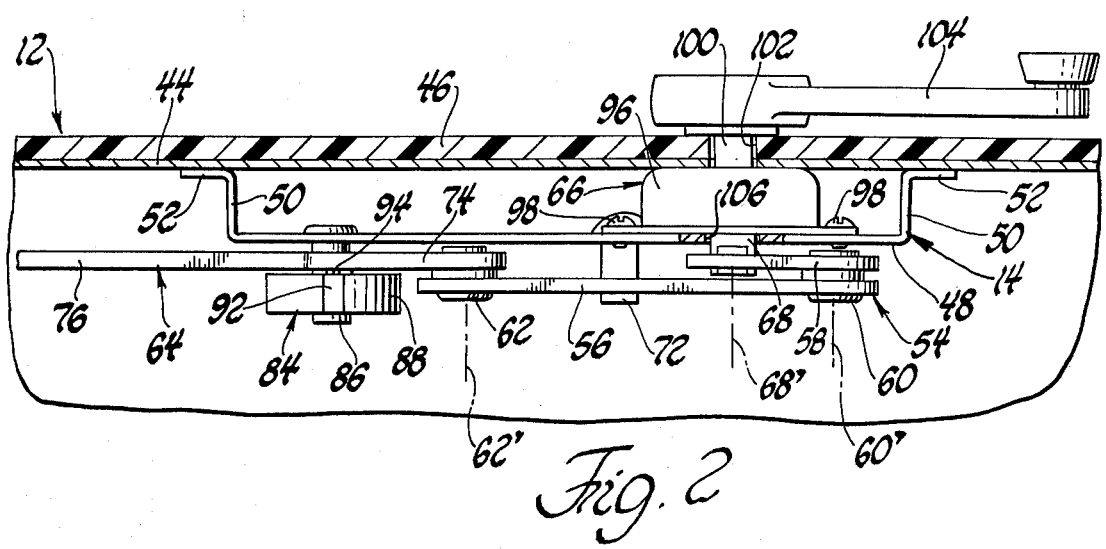
FIG. 2 is a sectional view taken along line 2—2 of FIG. 1 through the door and showing the window regulator.

The door 12 includes a fixed upper window 30, and a movable lower window 32 located below the upper window. A frame 34 supports the periphery of the upper window and also supports a rear guide 36 for the rear edge of the lower window 32. The front end of the lower window is supported by a front guide 38 within the door 12. A portion 40 of the upper window 30 extends downwardly and forwardly in front of the lower window and terminates just above the window regulator 14. This window regulator 14 is connected to the lower window 32 and moves this window vertically within its guides 36 and 38 between an upper closed position and a lower open position that are respectively shown by solid and phantom line representation in FIG. 1. The window regulator 14 is received within the door 12 between its outer panel 42, FIG. 1, and its inner panel 44, FIG. 2. An inner trim material 46 shown in FIG. 2 is secured to the inboard side of the door inner panel 44 by a suitable adhesive and a frame 48 of the window regulator is secured to the outboard side of the door inner panel to mount the window regulator. The window regulator frame 48 has a plate-like construction whose ends 50 are bent to form a flattened U-shaped configuration, FIG. 2, and have flanges 52 that are preferably welded to the door inner panel 42.

Figure 3:
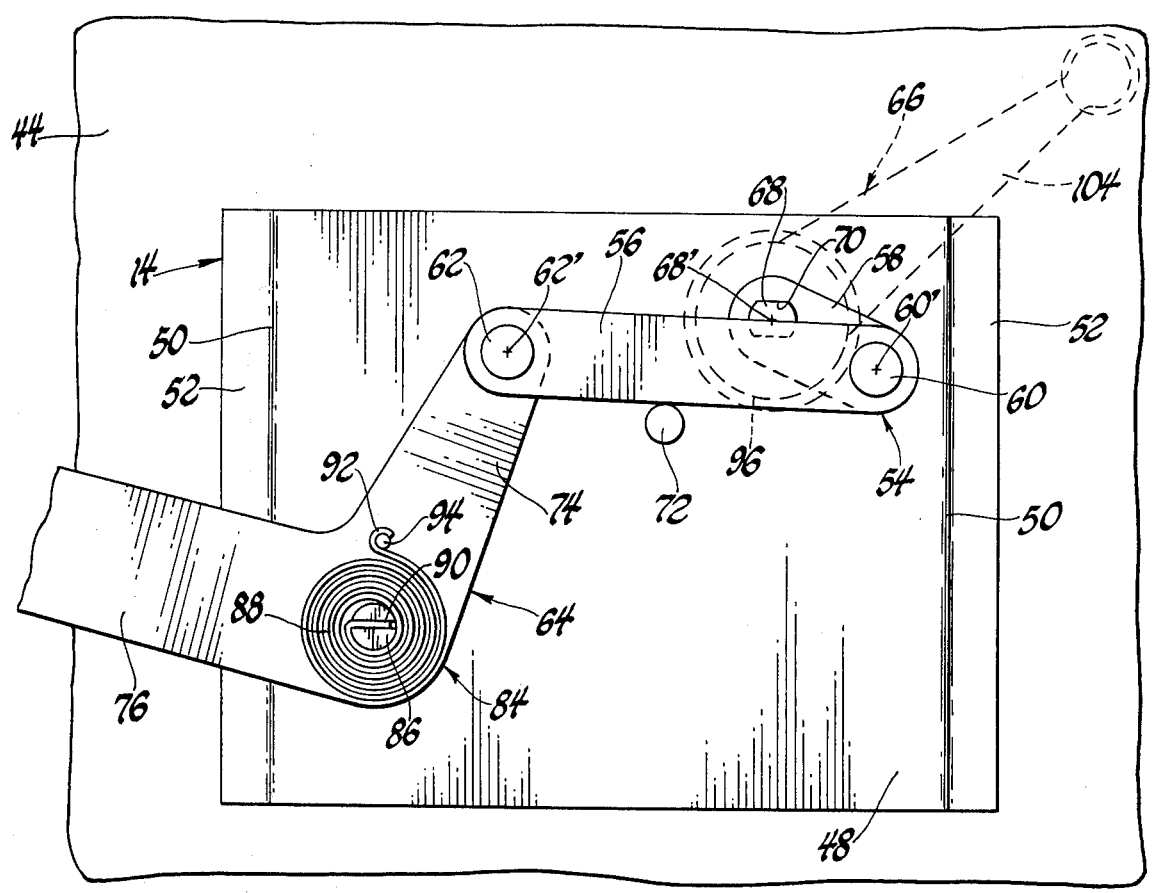
FIG. 3 is an enlarged view of the window regulator shown in FIG. 1 with a toggle linkage of the regulator in an overlapping position.
Figure 4:
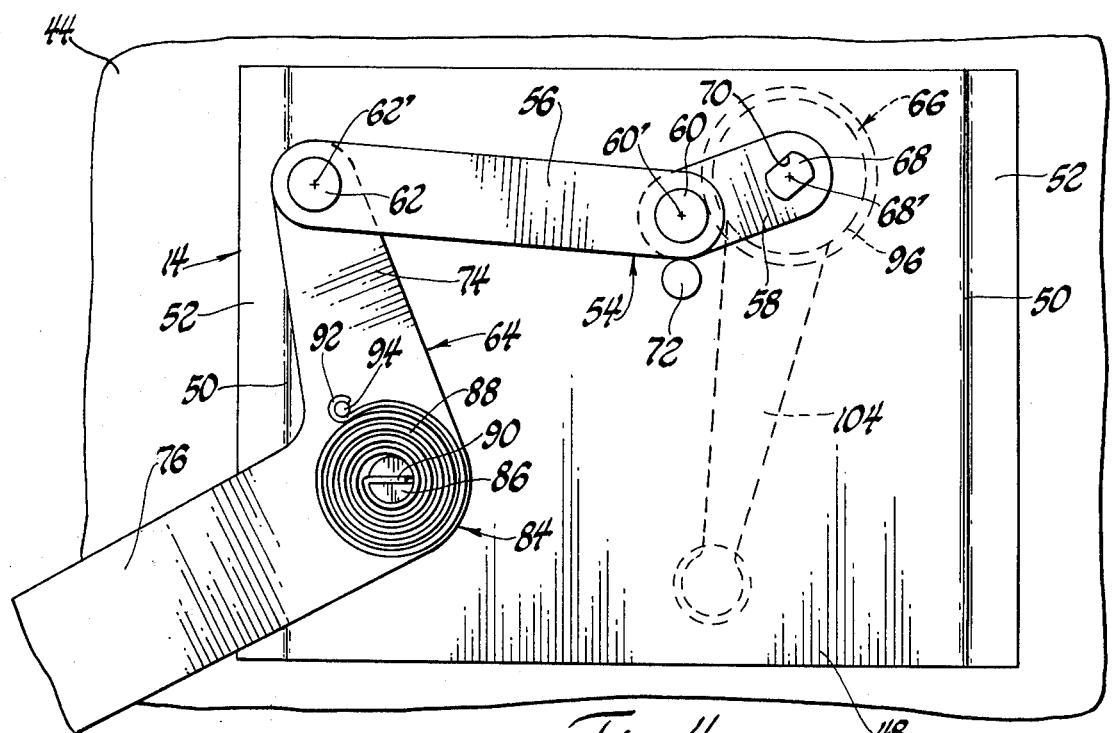
FIG. 4 is a view similar to FIG. 3 but with the toggle linkage moved to an extended position.

With reference to FIGS. 3 and 4, a toggle linkage 54 of the window regulator includes a long link 56 and a short link 58 that are pivotally connected to each other by a pin 60 about a first axis 60' at the center of this pin. Link 56 is pivotally connected by a pin 62 to a control member 64 that is pivotally mounted on the frame and connected to the movable lower window 32, as can be seen by momentary reference to FIG. 1. The pivotal interconnection between link 56 and control member 64 is about a second axis of the linkage at the center 62' of pin 62. A manually pivoted actuator generally indicated by 66 includes an output shaft 68 with flattened sides that are received within an aperture 70 in the opposite end of link 58 from pin 60. Link 58 is thus pivotally supported for movement about a third axis 68' at the center of shaft 68.

When the actuator 66 moves the link 58 to the position shown in FIG. 3, the toggle linkage 54 moves into an overlapping position and causes the control member 64 to pivot clockwise about the frame 48 so as to move the lower window 32 to its upper closed position. A stop 72 mounted on the regulator frame 48 engages the lower side of the longer link 56 as the toggle linkage moves into this overlapping position. The first linkage axis 60' at the center of pin 60 moves downwardly across a line between the second and third axes 62' and 68' as the linkage moves into the overlapping position into engagement with the stop 72. Consequently, forces applied to the window 32 tending to pivot the control member 64 counterclockwise pull the link 56 to the left into engagement with the stop 72 so that the linkage provides a locking action preventing downward opening movement of this window.

The actuator 66 is manually pivoted counterclockwise from the position of FIG. 3 toward the position of FIG. 4 to cause opening movement of the lower window. As this counterclockwise pivoting proceeds, the toggle linkage 54 moves toward the extended position shown in FIG. 4 and causes the control member 64 to pivot counterclockwise and move the lower window downwardly. The pivotally interconnected ends of links 56 and 58 at pin 60 move into engagement with the stop 72 as the window reaches its fully open position concomitant with the linkage moving into its FIG. 4 extended position. The first linkage axis 60' at the center of pin 60 moves downwardly across a line between the second and third axes 62' and 68' as the linkage moves into this extended position. Consequently, upward forces applied directly to the lower window in its lower open position tend to rotate the control member 64 clockwise about the frame such that the center of linkage 54 is pushed downwardly against the stop 72 to thereby provide a locking action that prevents opening movement of the window.

As seen in FIG. 1, the control member 64 of the window regulator 14 includes a short arm 74 and a long arm 76 that project from a common juncture. Pin 62 connects the long link 56 of the toggle linkage to the outer end of the short arm 74. The outer end of the long arm 76 carries a pin 78 that is received within a slot 80 in a bracket 82 mounted on the lower edge of lower window 32. Pin 78 slides back and forth within the slot 80 as the window is moved between the open and closed positions by the window regulator. During this movement, a pivotal counterbalance 84, FIGS. 3 and 4, counterbalances the weight of the window. This counterbalance 84 includes a pin 86 that is mounted on the window regulator frame 48 to support the control member for its pivotal movement. A spiraling spring 88 encircles the pin 86 and has an inner end 90 received within a slot in the pin 86 and an outer end 92 that is hooked over a pin 94 on the control member. Spring 88 thus biases the control member 64 clockwise about its pivotal support on pin 86 to counterbalance the lower window weight.

With reference to FIG. 2, the pivotal actuator 66 preferably comprises a one-way clutch 96 that is secured to the inboard side of the frame 48 by screws 98 so as to be located between the frame and the door inner panel 44. An input shaft 100 of the clutch extends in an inboard direction through an opening 102 in the door inner panel 42 and its trim material 46 and supports a manually rotated handle 104. This handle 104 pivots between ½ and ¾ of a revolution to move the lower window between its open and closed positions. The output shaft 68 of the actuator 66 constitutes the output shaft of the clutch 96 and projects through an opening 106 in the frame 48 for connection to the toggle linkage 54 which is located on the other side of the frame from the clutch. As previously mentioned, clutch 96 is a one-way clutch and allows rotation of its input shaft 100 by handle 104 to rotate its output shaft 68; but, forces applied to the output shaft 68 cannot rotate the input shaft 100 due to the one-way action of the clutch. Consequently, the clutch 96 positions the toggle linkage 54 in intermediate positions between those of FIGS. 3 and 4 to maintain the window 32 in partially open positions. When the window is in its fully open or its closed position, the one-way clutch 96 cooperates with the locking action of the toggle linkage in maintaining the window against movement due to forces applied directly to the window.

The one-way clutch 96 per se is a conventional clutch and the structural details thereof will thus not herein be more fully described. Such a clutch is disclosed by U.S. Pat. No. 3,110,380, the disclosure of which is hereby incorporated by reference. Obviously, there are many structural embodiments which may be utilized to fulfill the function of clutch 96. Also, while the manually driven actuator 66 is preferably embodied as the one-way clutch, it too may be embodied by other actuators. Likewise, it is preferable for the one-way clutch 96 to be utilized for driving the toggle linkage, as shown, but the clutch may also be positioned at other locations and still provide its prevention of reverse driving due to forces applied directly to the lower window.

While a preferred embodiment has herein between described in detail, those skilled in the art will recognize various alternative designs and embodiments for practicing the present invention as defined by the following claims.

What is claimed is:

1. A window regulator for a vehicle body including a window movable between open and closed positions, the regulator comprising: a frame adapted to be mounted on the vehicle body; a control member of an L shape having long and short arms and a juncture therebetween pivotally mounted on the frame; said long arm having an outer end adapted to be connected to the window so that pivotal movement of the control member moves the window between its open and closed positions; a toggle linkage including a long link and a short link pivotally connected to each other about a first axis; means pivotally connecting the long link to the short arm of the control member about a second axis; pivotal actuator means supporting the short link on the frame for selective movement about a third axis so as to move the linkage between overlapping and extended positions and to thereby move the window between its open and closed positions; the first linkage axis moving across a line between the second and third axes upon linkage movement to either the overlapping or extended positions; and a stop mounted on the frame so as to engage and position the linkage in both its overlapping and extended positions and to thereby prevent window movement from the open or closed positions by forces applied directly to the window.

2. A window regulator as in claim 1 wherein the pivotal actuator means comprises a one-way clutch that prevents window movement in a partially open position due to forces applied directly to the window and also cooperates with the toggle linkage in the open or closed position of the window to prevent movement thereof due to forces applied directly to the window.

3. A window regulator as in claim 2 wherein the frame has a plate-like construction and the toggle linkage is located on one side of the frame while the one-way clutch is mounted on the opposite side of the frame, the one-way clutch having an input shaft projecting away from the frame and adapted to be driven by a manually moved handle, and the clutch having an output shaft projecting through the frame and supporting the other link of the linkage for movement about the third axis.

4. A window regulator as in claim 3 further including a pivotal counterbalance that mounts the control member on the frame at the juncture of its long and short arms.

5. A window regulator as in claim 1 which includes a one-way clutch that prevents window movement in a partially open position due to forces applied directly to the window and also cooperates with the toggle linkage in the open or closed positions of the window to prevent movement thereof due to forces applied directly to the window.

6. A window regulator for a vehicle body including a window movable between open and closed positions, the regulator comprising: a plate-like frame adapted to be mounted on the vehicle body; a control member of an L shape having a long arm adapted to be connected to the window and a short arm that is connected to the long arm at a common juncture; a pivotal counterbalance mounting the control member at the juncture of its long and short arms on the frame; a toggle linkage including a long link and a short link pivotally connected to each other about a first axis; means pivotally connecting the long link to the short arm of the control member about a second axis; a manually driven one-way clutch supporting the short link on the frame for selective movement about a third axis so as to move the linkage between overlapping and extended positions and to thereby move the window between its open and closed positions; the one-way clutch preventing movement of the window due to forces applied directly to the window; the first linkage axis moving across a line between the second and third axes upon linkage movement to either the overlapping or extended position; and a stop mounted on the frame so as to engage and position the linkage in both its overlapping and extended positions such that the linkage cooperates with the one-way clutch in preventing movement of the window from its open or closed positions due to forces applied directly to the window.

7. A vehicle body door comprising: a fixed upper window and a lower window movable vertically below the upper window between and upper closed position and a lower open position; a window regulator including a frame mounted on the door and a control member of an L shape having long and short arms and a juncture therebetween pivotally mounted on the frame and connected to the window so that pivotal movement of the control member moves the window between its open and closed positions; a toggle linkage including a long link and a short link pivotally connected to each other about a first axis; means pivotally connecting the long link to the short arm of the control member about a second axis; a manually driven one-way clutch that pivotally supports the short link on the frame for selective movement about a third axis so as to move the linkage between overlapping and extended positions and to thereby move the lower window between its open and closed positions; the one-way clutch preventing movement of the lower window due to forces applied directly to the lower window; the first linkage axis moving across a line between the second and third axes upon linkage movement to either the overlapping or extending positions; and a stop mounted on the frame so as to engage the linkage in both its overlapping and extended positions such that the linkage cooperates with the one-way clutch in preventing movement of the lower window from its open or closed positions due to forces applied directly to the lower window.

8. A door as in claim 7 wherein the fixed upper window includes a portion that projects forwardly and downwardly in front of the lower window.

9. A door as in claim 8 wherein the window regulator frame is mounted on the door below the forwardly and downwardly projecting portion of the fixed upper window, and the control member including a long arm that extends rearwardly for connection to the movable lower window and a short arm that is connected to the linkage about the second axis.

* * * * *